United States Patent [19]

Graves et al.

[11] Patent Number: 4,539,239
[45] Date of Patent: Sep. 3, 1985

[54] WINDOW SHADE, AND METHOD APPARATUS FOR MANUFACTURING SAME

[75] Inventors: Delbert E. Graves, Nora; George E. Craft, Freeport, both of Ill.

[73] Assignee: Newell Companies, Inc., Freeport, Ill.

[21] Appl. No.: 304,808

[22] Filed: Sep. 23, 1981

Related U.S. Application Data

[63] Continuation of Ser. No. 138,569, Apr. 8, 1980, abandoned, which is a continuation of Ser. No. 758,426, Jan. 11, 1977, abandoned.

[51] Int. Cl.³ ............................................. A47G 5/02
[52] U.S. Cl. .................................... 428/43; 160/263; 160/323 R; 160/405; 428/155; 428/167
[58] Field of Search ........................ 428/43, 155, 167; 160/84 R, 263, 323 R, 405; 156/344

[56] References Cited

U.S. PATENT DOCUMENTS 3,913,655 10/1975 Ogiro .............................. 160/84 R
4,006,770 2/1977 Ferguson ........................... 160/405

OTHER PUBLICATIONS

Clopay Advertising Brochure, Sure Fit, Jul. 1, 1976.
Newell Advertising Brochure, Magic Fit, 1975.

Primary Examiner—John E. Kittle
Attorney, Agent, or Firm—Baker & McKenzie

[57] ABSTRACT

A window shade which includes a sheet member formed from a material having the characteristics, with respect to strength, formability and shape retention, of plastics, which sheet member, by reason of the formation of one or more continuous cut lines, the penetration of which are controlled to rather carefully defined parameters, can be quickly and accurately sized to width at the time of installation by the final user, a method of manufacturing a window shade, and apparatus for manufacturing a window shade.

8 Claims, 13 Drawing Figures

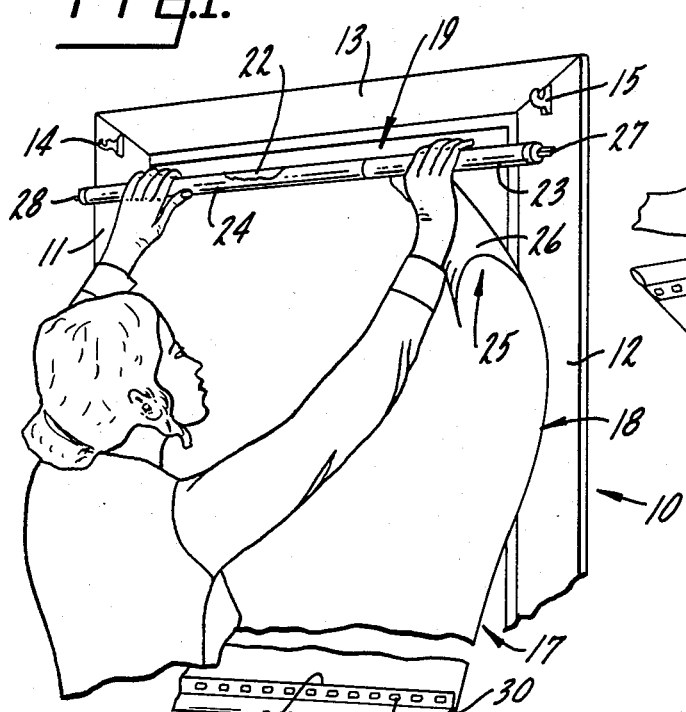
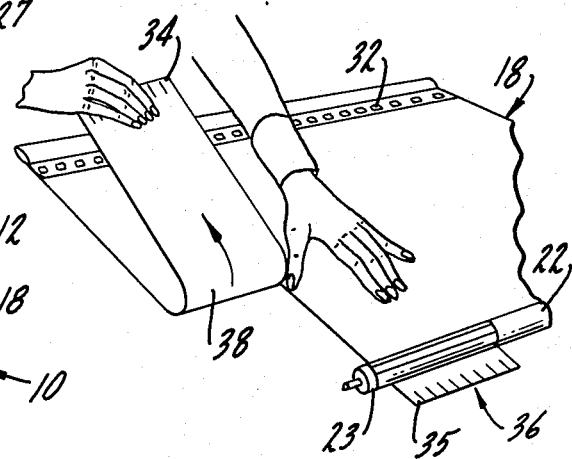
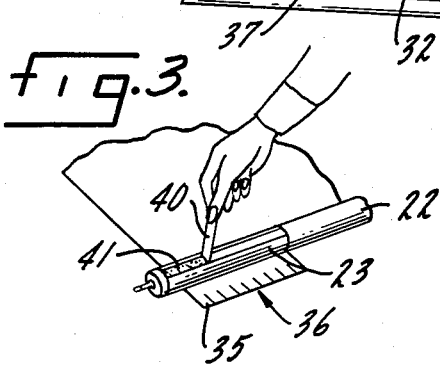
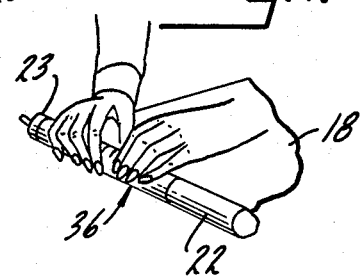
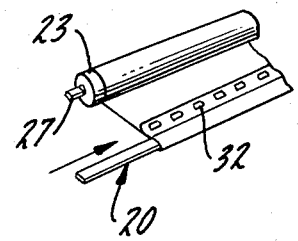
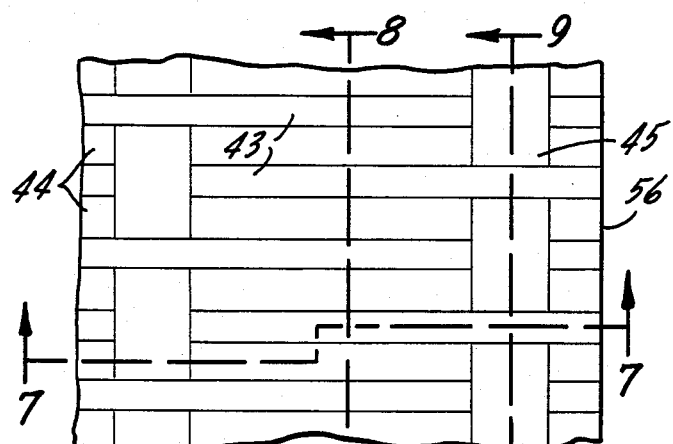
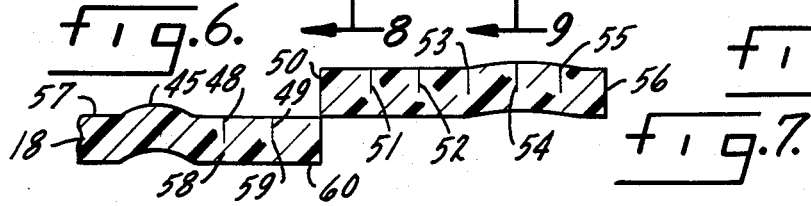

WINDOW SHADE, AND METHOD APPARATUS FOR MANUFACTURING SAME

This is a continuation of application Ser. No. 138,569, filed Apr. 8, 1980, now abandoned which application in turn is a continuation of application Ser. No. 758,426, filed Jan. 11, 1977, now abandoned.

This invention related to the window shade art, and specifically to a new and improved window shade, a method of manufacturing a new and improved window shade, and apparatus for the manufacture of window shades.

Window shades are conventionally available for purchase in a single width of continuous, uninterrupted sheet material from the upper or top edge, which is conventionally attached to a roller assembly, to the bottom or lower edge which is conventionally formed into a pocket having a slat therein. It is necessary for the purchaser to know the exact dimension between the sides of the window frame to which the window shade is to be attached at the time of purchase. After making allowance for clearance, so that the window shade, after installation, will run free, the exact required width of the window shade to be purchased can be deduced.

Since the required shade width is seldom the same as the width of the window shade assembly carried in stock by the retail outlets, the shade assembly normally must be cut to width by the vendor's personnel at the time of purchase by use of special, rather bulky, and space consuming equipment located near the point of sale.

As a consequence, personnel must be available to interpret the purchaser's requirements, which requirements, with respect to width, are frequently somewhat vague and indefinite, and have the mechanical ability and time to operate the aforesaid special shade cutting equipment.

To the above requirement is added the possibility that, despite the care taken by the vendor's personnel in the width cutting of the window shade, the product which is sized to width at the time of purchase is, all too frequently, too long or too short, and the purchasing process becomes a source of customer dissatisfaction through no fault of the vendor.

Frequently a window shade vendor will stock a number of different widths of shades so that a five foot shade need not be altered to produce a 31 inch window shade, thereby reducing the cost to the consumer somewhat by roughly initially matching the unaltered shade width to the customer's required width. However, although this results in a cost saving from the standpoint of conservation of material, the other disadvantages of high labor costs, investment in shade cutting equipment, use of valuable merchandising space for the cutting equipment, availability of trained personnel, somewhat limited selection of window shades, and a potential for customer dissatisfaction are all present even when a plurality of basic widths are stocked.

SUMMARY OF THE INVENTION

The primary objects of the invention are to provide a sheet member especially adapted for use in window shade assemblies which are easy to purchase and install properly by the consumer, thereby eliminating all of the aforementioned disadvantages of conventional window shade assemblies, a method of manufacturing such a window shade, and apparatus for manufacturing a window shade.

These objects are accomplished by providing a sheet member formed from a material having the characteristics, with respect to strength, formability and shape retention, of plastic, which sheet member, by reason of the formation of one or more continuous cut lines, the penetration of which are controlled to rather carefully defined parameters, can be quickly and accurately sized to width at the time of installation by the final user.

DESCRIPTION OF THE INVENTION

The invention is illustrated more or less diagrammatically in the accompanying drawing wherein:

FIG. 1 illustrates the step of sizing the window shade assembly of this invention during the installation process by the final user, which, in this instance is shown to be a home dweller;

FIG. 2 illustrates the subsequent step of stripping the window shade assembly to its proper width following the sizing step;

FIG. 3 illustrates the subsequent step of preparing means for securing the upper end portion of the sheet member of the window shade assembly to a roller assembly;

FIG. 4 illustrates the subsequent step of securing the upper end portion of the sheet member to the roller assembly;

FIG. 5 illustrates the step of inserting slat means into the lower end portion of the window shade assembly;

FIG. 6 is a top view of a portion of the sheet material from which a window shade is formed;

FIG. 7 is a view taken substantially along the line 7—7 of FIG. 6 with depth dimension shown to an enlarged scale;

FIG. 8 is a view taken substantially along the line 8—8 of FIG. 6 with the depth dimension shown to an enlarged scale;

FIG. 9 is a view taken substantially along the line 9—9 of FIG. 6 with the depth dimension shown to an enlarged scale;

Like reference numerals will be used to refer to like parts from Figure to Figure of the drawing.

Figure 10:
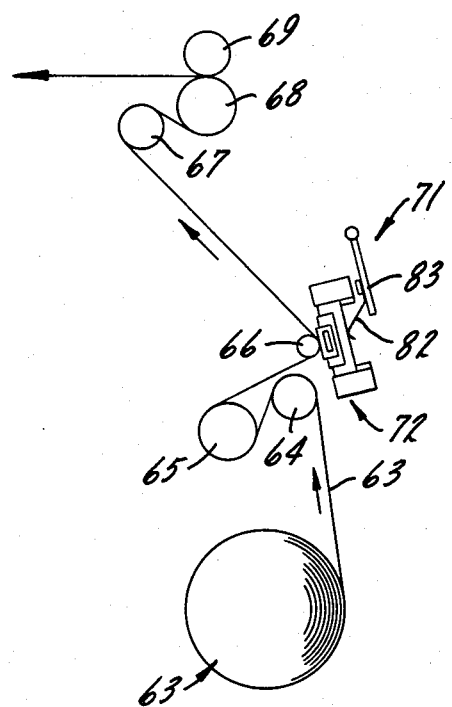
FIG. 10 is a schematic view of an essential step in the unique method of manufacture of the window shade of the invention.

In FIGS. 1 through 5 inclusive, the new and improved window shade of this invention, and its method of installation by the final user, is illustrated.

In FIG. 1 a window frame to which the improved window shade of this invention is to be secured is indicated generally at 10, the frame consisting of left side frame member 11, right side frame member 12 and top frame member 13. Conventional window shade brackets are indicated at 14 and 15, right bracket 15 being adapted to receive a conventional flatted end pin of a window shade roller assembly, and left bracket 14 being adapted to receive a conventional round end pin.

The window shade assembly is indicated generally at 17. It includes a sheet member, indicated generally at 18, a telescopic roller assembly, indicated generally at 19 and a slat assembly, indicated generally at 20.

The sheet member 18 is formed from a material having the characteristics, with respect to compressibility, strength and formability, of plastic. One suitable material is polyvinyl chloride, although other materials such as polyethylene, polypropalene and polyolefins may be used. Also the product known as Mylar may, in certain circumstances be employed. For purposes of further description it will be assumed that a polyvinyl chloride flexible sheet material whose thickness lies in the range of from about 3.5 mils to about 8 mils will be used. It should be understood however that the thickness, or depth, of the material from which the sheet member is formed may be somewhat thinner, or somewhat thicker than the above mentioned range, dependent upon other factors, such as cost, handling ability, side strength, and cutting ability, all as will appear hereinafter.

Irrespective of what plastic type material is employed however the material will have a plastic memory whereby the material, when deformed, as by cutting to a depth less than the thickness of the material, tends to return to its original configuration.

The telescopic roller assembly illustrated in FIG. 1 consists of an outer, larger diameter section 22 and an inner, smaller diameter section 23. The inner section 23 is received within the outer section 22, and the inner section 23 is slideable with respect to the outer section 22 so that the overall length dimension of the telescopic roller assembly (which represents the width of the window shade) may be adjusted as needed. As indicated in FIG. 1, the left portion 24 of the upper end portion 25 of the sheet member 18 is affixed to the outer, larger diameter roller section 22 by any suitable means, and, in this instance, is wrapped once there around.

The right portion 26 of the upper end portion of the sheet member is not connected to the telescoping roller assembly at the commencement of the sizing operation in the installation process, for purposes which will be explained hereinafter.

The right end of the inner roller section 23 includes a conventional flatted end pin assembly 27, and the left end portion includes conventional round end pin assembly 28. The telescopic roller assembly includes a conventional shade motor assembly, but since the construction and operation of the shade motor is conventional, it is not illustrated or described.

The lower end portion of the sheet member has been doubled back and fastened to itself to form a slat pocket, indicated generally at 30, in which a slat assembly 31 is received. Any suitable means may be employed to secure the doubled back edge of the sheet member to the body of the sheet member. In this instance a plurality of heat seals have been employed, indicated at 32, which heat seal locations are carefully selected as will be apparent hereinafter.

In the sizing step illustrated in FIG. 1, the installer, here a home dweller, is holding the telescopic roller assembly up to the window shade brackets 14 and 15 in order to size the shade. The inner telescopic roller section 23 is then slid inwardly, or to the left as viewed in FIG. 1, into the outer telescopic roller section 22 in order to correctly adjust the overall length of the telescopic roller assembly, and thereby the width of the shade. Preferably the telescopic roller assembly is placed in the brackets 14 and 15 to ensure correct sizing.

Thereafter the roller is removed from the bracket without changing the relative positions of the inner and outer telescoping roller sections. The window shade is then placed on a flat surface such as a table or a floor as indicated in FIG. 2.

Referring now to FIG. 2 it will be noted that the right portion 26 of the upper or top end portion 25 of the shade has a series of tabs formed therein, two of which are indicated at 34 and 35. Each tab is formed by a cut which extends completely through the material from which the sheet member is formed, commencing from the top edge.

As will be explained in detail hereinafter each tab actually represents the terminus of a continuous cut which is formed within the body of the flexible material, each tab being defined by the ends of two adjacent continuous cuts, also sometimes herein referred to as cut lines. Each cut line extends continuously from the upper end portion of the sheet member to the lower edge, and penetrates inwardly from one surface of the sheet member a distance less than the thickness of the sheet member.

Typical depth of penetration in a material having a thickness of about 3½ mils to about 8 mils is 1.5 mils to 1.75 mils. It should be understood however that penetrations of greater or lesser depth may be employed, the only requirement being that the depth of penetration of the continuous cut line be sufficient to enable the excess material to be peeled or stripped easily, and that the depth of material lying between the bottom of the continuous cut and the other side of the shade has sufficient strength to resist deformation of the sheet member when exposed to normal manufacturing, transportation and handling stresses to which the sheet member may be subjected prior to and during final installation.

As illustrated in FIG. 2 the installer had determined that the cut line which lies between tabs 34 and 35 represents the correct shade width, and, accordingly, after grasping the sheet member to the left of the cut line with one hand, and to the right of the cut line with the other hand, the excess material, represented at 38, is being stripped away.

The heat seals 32 are located between adjacent continuous cut lines. Accordingly, when the peeling action reaches the bottom of the shade, the installer, with the exercise of reasonable care, is able to tear around the slat pocket so that the entire excess portion 38 may be easily removed. It will be understood of course that the slat assembly 20 will have been removed prior to the stripping of the excess portion of the sheet member.

After the sheet member has been stripped to its proper width, the installer pulls a protective paper strip 40 away from an adhesive substance 41 which is coated on the inner section 23 of the telescopic roller assembly as best illustrated in FIG. 3. The protective paper strip is peeled away only to the point where the right edge of outer telescopic roller section 22 begins.

After the protective paper strip is peeled away the remaining unattached portion 36 of the upper end portion of the sheet member is wrapped around the inner telescopic roller section 23 and secured thereto by means of the adhesive 41, as best illustrated in FIG. 4.

Thereafter the slat assembly 20 is reinserted in the slat pocket 30.

The window shade is now inserted in brackets 14 and 15 and is ready for use.

Referring now to FIGS. 6, 7, 8 and 9, the construction of the body of the sheet member of the window shade is illustrated in greater detail.

From an examination of those Figures it will be noted that high points and low points appear in the shade; in this instance, the high points and low points appear in both the upper surface and the lower surface of the shade, and that the peaks and valleys are of substantial heights and depths relative to the thickness of the sheet member.

Specifically, and referring to FIGS. 6 and 8, it will be noted that a series of elevated areas or peaks appear as a result of ridges 43, and a series of low points are formed as a result of the valleys 44 which are formed between adjacent ridges 43. The under surface (or exterior side when installed in the brackets 14 and 15) reflects high points and low points which are the opposite of those described in connection with the top (or, when installed,) interior surface of the sheet member.

Further, and referring specifically to FIG. 7, it will be noted that the surface in which the cuts are formed has high points (for example, the area indicated at 45, and the area at the top of the raised area in which the top of cut 54 terminates), and low points (for example, the area indicated at 57, and the horizontal area in which the tops of cuts 51 and 52 terminate, respectively), and that the depth, (or difference in elevation as viewed in FIG. 7) between the high and low points is substantial when measured with respect to any convenient reference line, such as a linear reference line which lies in the plane of the cut.

As will be noted from FIG. 9, the shade may have high points and low points in the direction of the drop of the shade as well as the direction of the width as illustrated in FIGS. 6 and 8.

In FIGS. 9 and 10, a rather substantial depression is formed in the sheet member as a result of a major rib 45, the exterior surface of the sheet member including a rather deep impression, indicated at 46.

The cut lines referred to above are illustrated best in FIGS. 7, 8 and 9.

Referring first to FIG. 7, the sheet member is indicated in its condition prior to the stripping to width operation illustrated in FIG. 2.

A series of cut lines 48, 49, 50, 51, 52, 53, 54 and 55 are formed in the body of the sheet member adjacent one side, here right side edge 56. It will be noted that cut lines 48-55 are straight and parallel to one another, and right side edge 56 is parallel to the closest cut line 55.

Referring now to FIG. 7, it will be noted that each of cuts 48-55 penetrate downwardly from top surface 57 of the sheet member 18 a substantially equal distance. Thus, an uncut thickness 58 exists between the bottom 59 of each cut and the lower surface 60 of sheet member 18.

It will also be noted from FIG. 7 that the difference in the distances between, on the one hand, the high points and the low points (as measured in a direction perpendicular to a linear reference line, such as the earlier mentioned reference line which lie in the plane of a cut), and, on the other hand, the depth of a cut (again as measured in a direction perpendicular to such a reference line), is substantial; i.e.: the distance between a high point and a low point is at least a substantial portion of the distance represented by the depth of a cut. Indeed, the vertical distance between a high point and an adjacent low point, or, as mentioned above, between a peak and an adjacent valley, may be as much as approximately the depth of the cut which is formed in the sheet member, as illustrated, for example, in FIGS. 7, 8 and 9.

As can be appreciated from FIGS. 1-4, the cuts extend completely through the flexible sheet material for a short distance at the upper end of the sheet. If desired, cuts may be made at the lower end thereof. As best seen in FIGS. 1, 2, and 3, the result of through cutting is the series of tabs, two of which are indicated at 34 and 35.

The purpose of forming tabs in at least one end of the flexible sheet member are, firstly, to provide an indication to the consumer as to where the material should be grasped to facilitate a subsequent sizing to width by stripping, and, secondly, to facilitate the commencement of the stripping action.

Referring specifically now to FIG. 8, the condition of the sheet member is illustrated after the sheet member has been formed to its final size by tearing along a cut line, such as cut line 50, which is located between tabs 34 and 35. As can be appreciated, the portion of the sheet member to the right of cut line 50 has been determined to be excess material, and the user, after grasping the sheet member on either side of cut line 50, and preferably at tabs 34 and 35, has stripped the sheet along cut line 50, thereby severing the portion of the sheet member to the right of cut line 50. The severed area which corresponds to the uncut thickness 58, is illustrated, in a greatly exaggerated form for purposes of illustration at 61. Since the thickness of the sheet member is only a few mils, it will be appreciated that the severed area 61 is for all practical purposes, not detectable by the human eye, or, in otherwords, substantially invisible to the naked eye.

FIGS. 10 through 13 illustrate a unique method of manufacturing the window illustrated in FIGS. 1-9, and apparatus for manufacturing the shade.

In FIG. 10 a source of supply of the flexible sheet material from which the sheet members 18 are formed is indicated generally at 63. The flexible sheet material is shown in roll form of a suitable width which may, for example, be up to 72 inches, or even wider. It passes from the source of supply to a pair of idler rollers 64, 65, the purpose of which is to ensure that the flexible sheet material approaches the support structure, here roller 66, at the proper angle and under some tension. From the support structure 66, and following the cutting action which occurs there, the material passes to another idler 67, a drive roller 68 and a final idler 69 from where it moves toward a subsequent processing station. Said station may, for example, be a cutting station which cuts the flexible sheet material into sheet members of the desired drop distance, and simultantously forms the tabs 34, 35 in one end of the sheet by any suitable means, such as a separation under vertically applied pressure forces.

Figure 11:
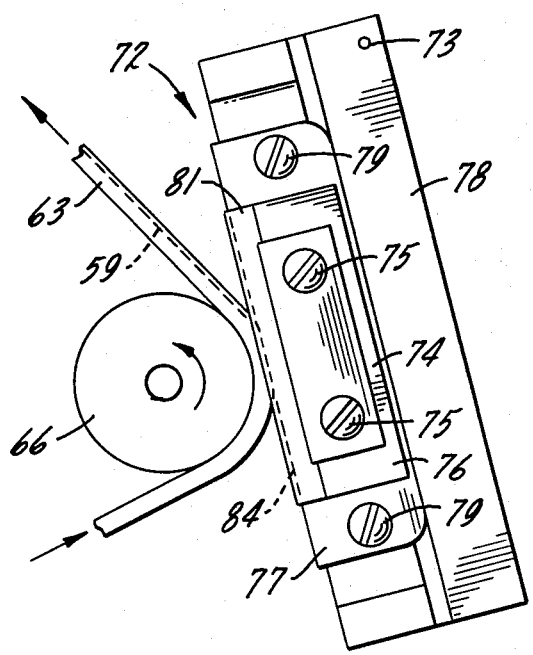
FIG. 11 is a detailed view to an enlarged scale of the cutting operation in the shade manufacturing method illustrated in FIG. 10.
Figure 12:
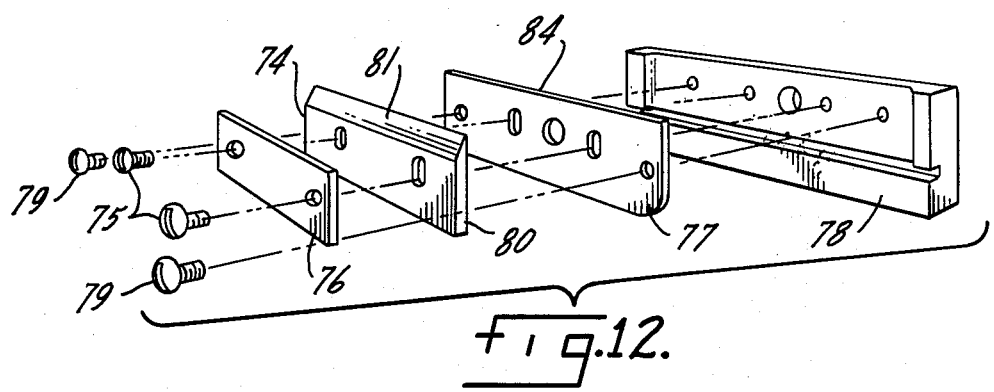
FIG. 12 is an exploded, perspective view of the cutting apparatus illustrated in FIGS. 10 and 11.
Figure 13:
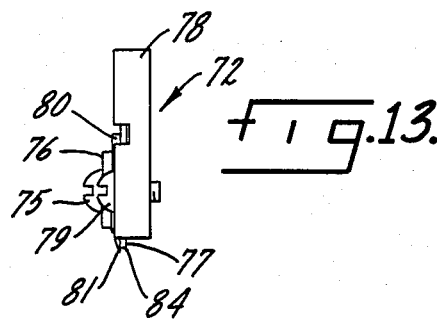
FIG. 13 is an end view of the cutting apparatus illustrated in FIGS. 10 through 12 inclusive.

The apparatus for forming the continuous cut lines 48-55 in the flexible sheet material is indicated generally at 71 in FIG. 10, and illustrated in greater detail in FIGS. 11-13 inclusive.

The cutting apparatus 67 includes a cutting assembly, indicated generally at 72, which is, in this instance, pivotally suspended, as at 73, from the balance of the cutting apparatus at the cutting station.

The cutting assembly includes a cutter, in this instance an elongated blade, 74, which is secured, as by retainer screws 75 and blade retainer plate 76, to a press member 77, and a blade holder 78. The press member 77 may be secured directly to the blade holder 78 by retainer screws 79. It will be understood that by using slots in cutter 74 and press member 77 which are disposed with their major axis perpendicular to the edge of the cutter, the relative positions of the cutter and the press member can be varied relative to one another, and relative to the blade assembly holder 78, all as illustrated best in the exploded perspective view of FIG. 12.

The cutter includes a shank section 80 which terminates at its working end in a blade or cutter 81. The blade is formed by the intersection of two planes as can be best visualized in FIGS. 12 and 13. The angle of the blade may be varied considerably and still produce an acceptable cut, but a blade angle on the order of about 20 degrees is preferred.

As can best be noted from FIGS. 11 and 13, the press member 77 abuts the cutter 74 and is displaced inwardly, as viewed in FIG 3, or outwardly, as viewed in FIG 11, a short distance.

The cutting action can best be appreciated from FIG. 11.

The flexible sheet material 63 passes around the support structure 66 under substantial tension derived from suitable adjustment of idler rollers 64, 65, 67, and the force imposed by drive roller 68. Further, the cutting assembly 72 is pressed against the outer surface of flexible sheet material 63, as viewed with respect to the center of support structure 66 in FIG. 11, by a force derived from the action of gravity acting upon the cutting assembly 72 and, to a lesser extent, by a yieldable, externally applied force derived from spring means 82. The spring means 82 is supported from a fixed support 83 and bears against the rear or outer face of blade assembly holder 78, as best illustrated in FIG. 10.

Spring means 83 also serves the function of dampening undesirable oscillation of the cutting assembly 72 due to machine vibration, irregularities in the surface of the flexible sheet material 63, or other causes.

As best noted in FIG. 11, the force imposed against the flexible sheet material 63 from press member 77 is sufficient to depress the sheet material into continuous abutting contact with both the external surfaces of the support structure 66, and the internal pressing surface 84 of press member 77. As a result, the cutter 74 will always cut to a uniform depth.

Since the flexible sheet material has a plastic memory, the material will return to its precutting shape which is typified by FIGS. 6 through 9. Since the cut area 62 of FIGS. 8 and 9 was cut when the condition of the flexible sheet material was deformed so that the upper and lower surfaces 57 and 60 of the sheet material were flat and parallel to one another, the bottom of the cut will assume the substantially sinuous configuration illustrated in FIGS. 8 and 9, or, stated another way, the bottom of the cut defines a line whose contour is substantially identical to the contour of the peaks and valleys on the surface of the sheet in which the continuous cut is formed.

Although a preferred embodiment of the invention has been illustrated and described, it will be understood that the foregoing description is intended to be exemplary and not definitive. Accordingly it is intended that the scope of the invention be defined, not by the scope of the foregoing description, but rather by the claims when interpreted in light of the pertinent prior art.

I claim:

1. In a flexible sheet member for use in a window shade assembly wherein the sheet member is composed of a sheet of flexible plastic material; said sheet member having at least one line of weakness therein which is invisible to the naked eye; said line of weakness, or lines of weakness, extending from the top end portion to the bottom end portion of the sheet and along at least one edge portion thereof; each of said lines of weakness being formed by a continuous cut which penetrates into the sheet member only a portion of the thickness of said plastic sheet material; each of said lines of weakness being generally parallel to one another and so formed that, upon peeling two portions of the sheet material apart along one of said lines of weakness, a straight edge is formed on each separated sheet portion; the improvement characterized in that said plastic sheet member includes a body of said plastic material defined by an upper surface on one side and a lower surface on the other side;

said continuous cut is formed in said upper surface of the plastic sheet member;

said upper surface of the plastic sheet member in which the continuous cut is formed has peaks and valleys;

the vertical distance between a peak and an adjacent valley on said upper surface of the plastic sheet member is substantial, being as much as approximately the depth of the cut which is formed in the sheet member;

each of the continuous cuts penetrates into the plastic sheet member to a substantially constant depth from said upper surface at all locations along the length of the cut from at least the top end portion to the bottom end portion of the plastic sheet member;

said lower surface of the plastic sheet member which does not contain the continuous cut has peaks and valleys located generally opposite the peaks and valleys in said upper surface in which the continuous cut is formed; and the uncut body portion of the sheet member lying beneath the continuous cut is of a substantially uniform thickness along the entire length of the uncut body portion.

2. The sheet member of claim 1 further characterized in that the cut extends completely through the entire thickness of the sheet member for a short distance at one end portion of the sheet member.

3. The sheet member of claim 1 further characterized in that a plurality of cuts are formed in the sheet member adjacent to said one side.

4. The sheet member of claim 3 further characterized in that said cuts are spaced substantially constant distances from one another in a direction generally perpendicular to the major orientation of the cuts from point to point along each cut.

5. The sheet member of claim 4 further characterized in that said cuts are uni-directional.

6. A flexible plastic sheet member having peaks and valleys in at least one surface thereof for use in a window shade which is sizable to width at the point of installation without the use of tools, said flexible plastic sheet member having a first surface in which peaks and valleys of substantial heights and depths, relative to the thickness of the sheet member, are present, at least one continuous cut in said sheet member which is substantially invisible to the naked eye, said continuous cut, or cuts, extending from the top end portion to the bottom end portion of the sheet member along at least one edge thereof, said continuous cut penetrating from the surface having said peaks and valleys into the body of said sheet member to a substantially constant depth whereby the bottom of the cut defines a line whose contours is substantially identical to the contour of the peaks and valleys on the surface of the sheet in which the continuous cut is formed, the uncut portion of the body of the sheet member lying beneath the continuous cut being sufficiently thick to resist separation of the sheet member when exposed to normal manufacturing, transportation and handling stresses to which it may be subjected prior to and during final installation.

7. The flexible plastic sheet member of claim 6 further characterized in that the continuous cut extends completely through the entire thickness of the flexible plastic sheet member for a short distance at one end portion of the sheet member.

8. The flexible plastic sheet member of claim 7 further characterized in that the continuous cut extends completely through the entire thickness of the flexible plastic sheet member for a short distance at the top end portion of the sheet member.

* * * * *